(12) United States Patent
Kim et al.

(10) Patent No.: US 11,689,991 B2
(45) Date of Patent: *Jun. 27, 2023

(54) METHOD AND APPARATUS FOR SEARCHING NETWORKS

(71) Applicant: Samsung Electronics Co., Ltd., Suwon-si (KR)

(72) Inventors: Hye Jeong Kim, Suwon-si (KR); Yun Gyu Bae, Suwon-si (KR); Sung Jin Park, Seoul (KR); Dong Suk Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 17/232,742

(22) Filed: Apr. 16, 2021

(65) Prior Publication Data

US 2021/0235364 A1 Jul. 29, 2021

Related U.S. Application Data

(63) Continuation of application No. 16/827,017, filed on Mar. 23, 2020, now Pat. No. 10,986,565, which is a
(Continued)

(30) Foreign Application Priority Data

May 14, 2015 (KR) .................. 10-2015-0067114
Nov. 13, 2015 (KR) .................. 10-2015-0159939

(51) Int. Cl.
*H04W 48/14* (2009.01)
*H04W 48/18* (2009.01)
(Continued)

(52) U.S. Cl.
CPC .......... *H04W 48/14* (2013.01); *H04W 8/183* (2013.01); *H04W 48/16* (2013.01); *H04W 48/18* (2013.01); *H04W 84/042* (2013.01)

(58) Field of Classification Search
CPC ... H04W 12/126; H04W 48/16; H04W 48/14; H04W 8/183; H04W 24/10
(Continued)

(56) References Cited

U.S. PATENT DOCUMENTS 5,241,598 A 8/1993 Raith
5,999,812 A * 12/1999 Himsworth ......... H04W 12/126
455/435.2
(Continued)

FOREIGN PATENT DOCUMENTS

CN 110636589 B * 11/2021 ............ H04B 17/27
EP 1 641 292 B1 1/2007
(Continued)

OTHER PUBLICATIONS

C. Hausl, J. Emmert, M. Mielke, B. Mehlhorn and C. Rowell, "Mobile Network Testing of 5G NR FR1 and FR2 Networks: Challenges and Solutions," 2022 16th European Conference on Antennas and Propagation (EuCAP), 2022, pp. 1-5, doi: 10.23919/EuCAP53622.2022.9769635. (Year: 2022).*

*Primary Examiner* — William D Cumming
(74) *Attorney, Agent, or Firm* — Jefferson IP Law, LLP

(57) ABSTRACT

An electronic device and network scan method thereof are provided. The electronic device includes a communication module connected to an antenna capable of transmitting signals to and receiving signals from a network, a memory configured to store a database including a plurality of items of network identification information and country information corresponding to each item of network identification information, and a processor configured to control the communication module to perform a first network scan with
(Continued)

respect to a specified frequency band of a specified radio access technology (RAT), determine country information using network identification information obtained by the first network scan and the database, and perform a second network scan with respect to a RAT and a frequency band determined based at least an the determined country information.

12 Claims, 10 Drawing Sheets

Related U.S. Application Data continuation of application No. 15/155,501, filed on May 16, 2016, now Pat. No. 10,602,432.

(51) Int. Cl.
    *H04W 8/18* (2009.01)
    *H04W 48/16* (2009.01)
    *H04W 84/04* (2009.01)

(58) Field of Classification Search
    USPC ............. 455/423, 435.2, 456.1, 558, 574
    See application file for complete search history.

(56) References Cited

U.S. PATENT DOCUMENTS

| | | | |
|---|---|---|---|
| 6,097,418 A | 8/2000 | Larsen et al. | |
| 6,148,308 A | 11/2000 | Neubauer et al. | |
| 6,256,364 B1 | 7/2001 | Toth et al. | |
| 6,279,881 B1 | 8/2001 | Nishi | |
| 6,434,377 B1 | 8/2002 | Penttinen | |
| 7,260,394 B2 | 8/2007 | Welnick et al. | |
| 7,283,507 B2 | 10/2007 | Buckley et al. | |
| 7,764,958 B2* | 7/2010 | Townsend | H04L 1/0045 455/423 |
| 8,107,955 B2 | 1/2012 | Islam et al. | |
| 9,066,279 B2 | 6/2015 | Sami et al. | |
| 9,241,044 B2 | 1/2016 | Shribman et al. | |
| 9,730,149 B2* | 8/2017 | Feng | H04W 48/16 |
| 9,742,866 B2 | 8/2017 | Shribman et al. | |
| 10,602,432 B2 | 3/2020 | Kim et al. | |
| 2002/0082010 A1* | 6/2002 | Koorapaty | H04W 48/16 455/574 |
| 2002/0147012 A1 | 10/2002 | Leung et al. | |
| 2004/0110503 A1 | 6/2004 | Park | |
| 2004/0259508 A1 | 12/2004 | Murakami et al. | |
| 2005/0210340 A1* | 9/2005 | Townsend | H04L 1/0026 714/701 |
| 2008/0096501 A1 | 4/2008 | Salomone et al. | |
| 2008/0102784 A1 | 5/2008 | Mittal et al. | |
| 2009/0181676 A1 | 7/2009 | Lee et al. | |
| 2009/0270030 A1 | 10/2009 | Jia et al. | |
| 2010/0002611 A1 | 1/2010 | Umatt et al. | |
| 2011/0183685 A1* | 7/2011 | Burton | G06F 21/316 455/456.1 |
| 2012/0289163 A1 | 11/2012 | Fu | |
| 2012/0309391 A1 | 12/2012 | Zhang et al. | |
| 2013/0012212 A1 | 1/2013 | Murakami et al. | |
| 2013/0210453 A1 | 8/2013 | Shirai et al. | |
| 2014/0051422 A1 | 2/2014 | Mittal et al. | |
| 2014/0241184 A1 | 8/2014 | Sami et al. | |
| 2015/0056985 A1 | 2/2015 | Swaminathan et al. | |
| 2015/0067819 A1 | 3/2015 | Shribman et al. | |
| 2015/0079985 A1 | 3/2015 | Vuchula et al. | |
| 2015/0119028 A1 | 4/2015 | Zhang | |
| 2015/0264640 A1* | 9/2015 | Feng | H04W 8/183 455/558 |
| 2015/0334575 A1 | 11/2015 | Joshi et al. | |
| 2016/0105530 A1 | 4/2016 | Shribman et al. | |
| 2016/0157161 A1 | 6/2016 | Miao et al. | |
| 2016/0337946 A1 | 11/2016 | Kim et al. | |
| 2018/0219970 A1 | 8/2018 | Shribman et al. | |
| 2019/0037047 A1 | 1/2019 | Shribman et al. | |
| 2019/0068750 A1 | 2/2019 | Shribman et al. | |
| 2020/0221371 A1* | 7/2020 | Kim | H04W 48/14 |
| 2021/0235364 A1* | 7/2021 | Kim | H04W 48/16 |

FOREIGN PATENT DOCUMENTS

| | | | | |
|---|---|---|---|---|
| EP | 2290842 A2 * | 3/2011 | ......... | H04B 7/18567 |
| EP | 2608606 A1 | 6/2013 | | |
| FR | 2862838 A1 | 5/2005 | | |
| JP | 2014042104 A * | 3/2014 | ............ | H04W 24/00 |
| WO | WO-0041425 A1 * | 7/2000 | ............ | H04W 48/18 |
| WO | 02/021861 A2 | 3/2002 | | |
| WO | WO-2013053234 A1 * | 4/2013 | ............ | H04W 48/16 |
| WO | WO-2014163411 A1 * | 10/2014 | ............ | H04L 41/06 |
| WO | 2014198014 A1 | 12/2014 | | |

\* cited by examiner

METHOD AND APPARATUS FOR SEARCHING NETWORKS

CROSS-REFERENCE TO RELATED APPLICATION(S)

This application is a continuation application of prior application Ser. No. 16/827,017, filed on Mar. 23, 2020, which will issue as U.S. Pat. No. 10,986,565 on Apr. 20, 2021, and which was based on and claimed priority to prior application Ser. No. 15/155,501, filed on May 16, 2016, which issued as U.S. Pat. No. 10,602,432 on Mar. 24, 2020, and which was based on and claimed the benefit of priority under 35 U.S.C. § 119(a) of a Korean patent application filed on May 14, 2015 in the Korean Intellectual Property Office and assigned Serial number 10-2015-0067114, and of a Korean patent application filed on Nov. 13, 2015 in the Korean Intellectual Property Office and assigned Serial number 10-2015-0159939, the entire disclosure of each of which is hereby incorporated by reference.

TECHNICAL FIELD

The present disclosure relates to a technology for enabling a terminal not connected to a network to quickly search for an accessible network.

BACKGROUND

An electronic device such as a smartphone may scan for networks in various situations. As a typical example, when an electronic device is turned on, the electronic device may search for a network with a highest priority from among available networks. For example, once a smartphone is turned on, the smartphone may search for adjacent cellular networks and may access an available network of a communications operator.

An environment (e.g., a country or a region) of a network accessed by a mobile device of a typical user does not vary greatly. Therefore, the mobile device may highly possibly re-access a network accessed recently or accessed before. That is, the mobile device may scan for networks using public land mobile network (PLMN) information accessed recently. For example, if a code number of a registered PLMN (RPLMN) stored in the mobile device is "45005", the mobile device may check a history of accessing a wideband code division multiple access (WCDMA) network of communications operator, SK Telecom, and may attempt to access an operator network of the SK Telecom. If the access is successful, the mobile device may perform a function related to wireless communication. If the mobile device is located outside the coverage of the operator network of the SK Telecom, the attempt to access the network fails. In this case, the mobile device may perform a full scan with respect to all available radio access technologies (RATs) and frequency bands.

Compared to $2^{nd}$ generation (2G)/$3^{rd}$ generation (3G) network communications, $4^{th}$ generation (4G) (e.g., long term evolution (LTE), LTE-advanced (LTE-A), etc.) and next generation network communications use more various frequency bands for each country/operator. For example, it was sufficient for mobile devices for the 2G/3G network communications to support transmission/reception of signals of WCDMA 2100 MHz band (W1 band), global system for mobile communications (GSM) 900/1800 MHz band, or GSM 850/1900 MHz band used in multiple countries/continents. However, mobile devices for the LTE network communications for which various frequency bands are used for each country may be equipped with a module (e.g., an antenna) for transmitting/receiving signals of various frequency bands used for LTE in addition to a module for transmitting/receiving signals of frequency bands used for the 3G network communications. In the case where there is a large number of frequency bands supported by a mobile device as described above, if the mobile device fails in a network scan and access attempt based on a network access history, the mobile device performs a full scan with respect to all RATs and frequency bands supported by the mobile device, and thus a time taken to discover an available network may increase. During this time, a user cannot be provided with a function/service of an electronic device associated with network communications, and may experience inconvenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for improving user experience by reducing a time taken for searching for an available network and a method therefor.

In accordance with an aspect of the present disclosure, an electronic device is provided. The electronic device includes a communication module connected to an antenna capable of transmitting signals to and receiving signals from a network, a memory configured to store a database including a plurality of items of network identification information and country information corresponding to each item of network identification information, and a processor configured to control the communication module to perform a first network scan with respect to a specified frequency band of a specified radio access technology (RAT), determine country information using network identification information obtained by the first network scan and the database, and perform a second network scan with respect to a RAT and a frequency band determined based at least on the determined country information.

In accordance with another aspect of the present disclosure, a network scan method of an electronic device is provided. The method includes performing a first network scan with respect to a specified frequency band of a specified RAT, obtaining country information based on the first network scan, determining a RAT and a frequency band to be scanned for based on the country information, and performing a second network scan with respect to the determined RAT and frequency band.

In accordance with yet another aspect of the present disclosure, an electronic device is provided. The electronic device includes a communication module, a memory, and a processor. The communication module is connected to an antenna capable of transmitting signals to and receiving signals from a network. The memory is configured to store a first list comprising information on a plurality of RATs and frequency bands supported by the electronic device, a second list comprising cell information which has been accessed before by the electronic device, and a third list comprising information on a specified RAT and a specified frequency band. The processor is configured to control to set a first schedule for defining network scan timings respectively for the first to third lists and perform a network scan based on the first schedule at least one time.

Other aspects, advantages, and salient features of the disclosure will become apparent to those skilled in the art from the following detailed description. which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
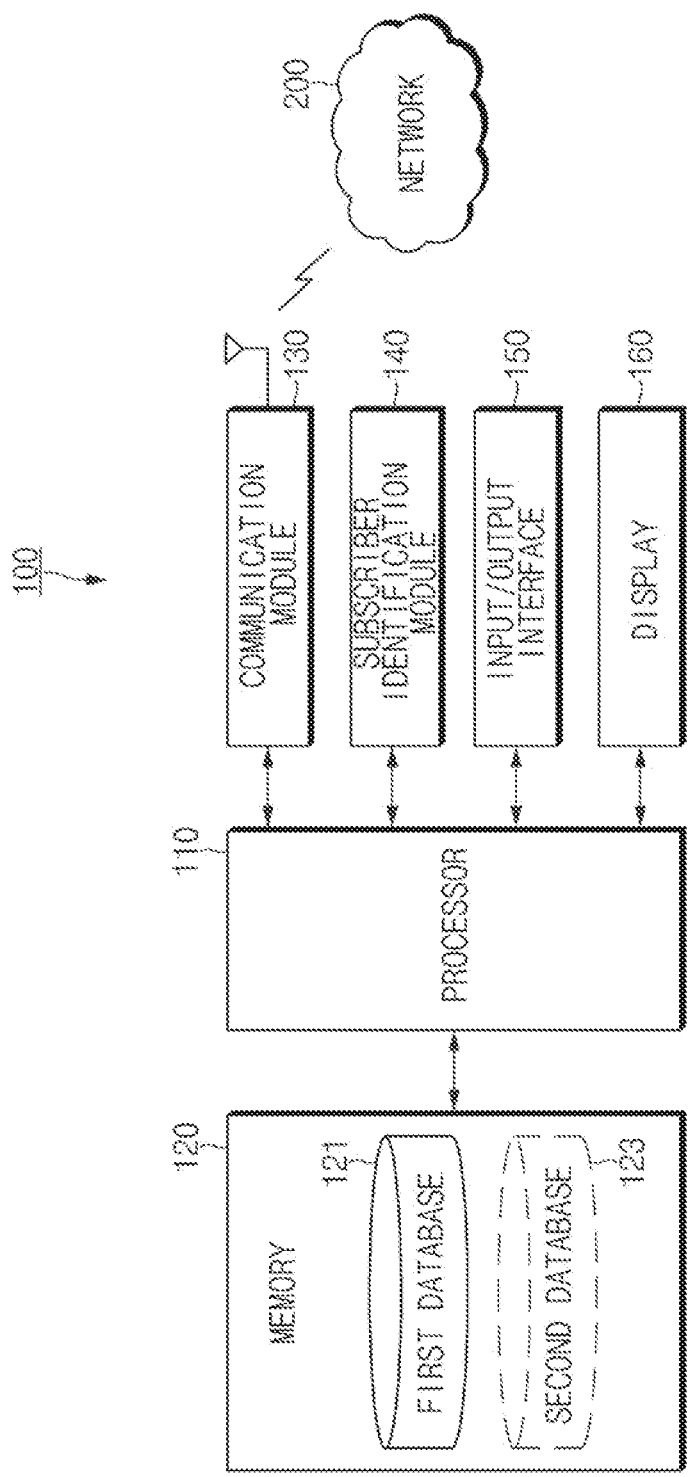
FIG. 1 illustrates an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "have", "may have", "include", "may include". "comprise", or the like used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second", or the like used herein may modify various elements regardless of the order and/or priority thereof, and is used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" used herein may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

The terms used herein, including technical or scientific terms, have the same meanings as understood by those skilled in the art. Terms defined in general dictionaries, among the terms used herein, may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer III (MP3) player, a mobile medical device, a camera, or a wearable device. According to various embodiments of the present disclosure, the wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an electronic device according to an embodiment of the present disclosure.

Referring to FIG. 1, an electronic device 100 may include a processor 110, a memory 120, and a communication module 130. The communication module 130 may be connected to an antenna capable of transmitting/receiving signals of various frequency bands. The electronic device 100 may further include additional elements such as a subscriber identification module (SIM) 140, an input/output interface 150, and a display 160. In various embodiments of the present disclosure, at least one of the foregoing elements may be omitted or another element may be added to the electronic device 100. The elements included in the electronic device 100 may be connected to each other via a bus. The bus may include a circuit for connecting the above-mentioned elements 110 to 160 to each other and transferring communications (e.g., control messages and/or data) among the above-mentioned elements. A connection relationship among the elements via the bus is not limited to that illustrated in FIG. 1. For example, the communication module 130 may have a bus directly connected to the memory 120.

The processor 110 may include at least one of a CPU, an AP, or a communication processor (CP). The processor 110 may perform data processing or an operation related to communication and/or control of at least one of the other elements of the electronic device 100.

The memory 120 may include a volatile memory and/or a nonvolatile memory. The memory 120, for example, may store instructions or data related to at least one of the other elements of the electronic device 100. According to an embodiment of the present disclosure, the memory 120 may store software and/or a program. The program may include, for example, a kernel, a middleware, an application programming interface (API), and/or an application program (or an "application"). At least a portion of the kernel, the middleware, or the API may be referred to as an operating system (OS).

In one embodiment of the present disclosure, the memory 120 may store a first database 121 including network identification information and country information corresponding to each network identification information. The first database 121 may be, for example, a public land mobile network (PLMN) database. In the first database 121, a PLMN may be identified with a mobile country code (MCC) and a mobile network code (MNC). For example, in the case where a PLMN code is "45008", the MCC may correspond to 450 and the MNC may correspond to 08. If the PLMN code is "45005", the MCC and the MNC may be 450 and 05 respectively. Here, the PLMN code may correspond to the network identification information, the MCC may correspond to the country information, and the MNC may correspond to communications operator information. In addition to the above-mentioned information, additional pieces of information may be included in the first database 121. For example, band information (e.g., wideband code division multiple access (WCDMA) band 1) corresponding to the network identification information may be further included.

The communication module 130, for example, may establish a wireless communication connection between the electronic device 100 and a network 200 (or an arbitrary access point (AP)). For example, at least one of cellular communication protocols such as LTE, LTE-A, CDMA, WCDMA, universal mobile telecommunications system (UMTS), wireless broadband (WiBro), or global system for mobile communications (GSM) may be used for wireless communications. Furthermore, the wireless communications may include at least one of Wi-Fi, Bluetooth (BT), near field communication (NFC), or global navigation satellite system (GNSS). The GNSS may include, for example, at least one of global positioning system (GPS), global orbiting navigation satellite system (GLONASS), BeiDou navigation satellite system (hereinafter referred to as "BeiDou"), or Galileo, the European global satellite-based navigation system. Hereinafter, the term "GPS" and the term "GNSS" may be interchangeably used.

The SIM 140 may include information on a communications operator to which a user of the electronic device 100 subscribes. In general, if the electronic device 100 is turned on, the processor 110 may activate the SIM 140, may obtain communications operator information included in the SIM 140, and may attempt to access a network provided by a corresponding operator.

In one embodiment of the present disclosure, the s SIM 140 may have a storage space, and may include a database in the storage space. This database may be differentiated from the first database 121 stored in the memory 120. The database stored in the SIM 140 may store network history information such as home network information of the user, network information (e.g., registered public land mobile network (RPLMN)) recently accessed, network information frequently accessed, network information set by the user, etc. For example, in the case where the user purchases the electronic device 100 and activates the electronic device 100 via the operator AT&T of the United States (U.S.), the home network information of the user may include information indicating that MNC is 030 (i.e., operator AT&T), MCC is 310 (i.e., US), radio access technology (RAT) is GSM, and a center frequency (band) is 850 MHz. In the case where the electronic device 100 attempts to search for a network in an out-of-service (OOS) state, the processor 110 may read the home network information from the SIM 140, and then may attempt to access a corresponding operator network. Here, the database stored in the SIM 140 may include information on a specific channel included in a specific band. For example, the SIM 140 may include band information of GSM 850 MHz and information on a specific channel lastly accessed by the electronic device 100 among a plurality of channels included in the band. The electronic device 100 may attempt to access a network by scanning only for a frequency band corresponding to the specific channel, instead of performing a scan with respect to all channels included in the GSM 850 MHz band. Herein, in a band represented by a specific frequency, the specific frequency represents a center frequency or a representative frequency of each band. For example, LTE band 1 has a center frequency of 2100 MHz, but has an uplink frequency band of 1920-1980 MHz and a downlink frequency band of 2110-2170 MHz. Furthermore, the band 1 includes a plurality of channels having bandwidths of 5, 10, 15, and 20 MHz. As described above, each band may include a plurality of channels having relatively narrow bandwidths.

For another example, if an available PLMN between the PLMN of a home network and the PLMN of a recently accessed network is discovered, the electronic device 100 may be immediately registered with a corresponding network. For example, in the case where PLMN 45008 is stored as a home network and PLMN 50502 is stored as a recently accessed network in the database of the SIM 140, once the electronic device 100 is turned on, the communication module 130 may search for a network (a GSM network of the communications operator YES OPTUS of Australia) corresponding to the PLMN 50502, and, if fails, may search for a home network (a WCDMA network of the KT of Republic of Korea) so as to attempt to access a network. If the electronic device 100 discovers neither of the networks, the electronic device 100 may attempt to search for all networks supportable by the communication module 130 and the antenna, or may perform a network search based on country information as described in various embodiments of the present disclosure.

In various embodiments of the present disclosure, the processor 110 may copy or back up the database stored in the SIM 140 to the memory 120 periodically or in response to occurrence of a specific event. For example, the processor 110 may copy the database stored in the SIM 140 to a second database 123 of the memory 120. Alternatively, in various embodiments of the present disclosure, data used for performing a network scan may be stored in the SIM 140 and the memory 120 entirely or selectively. For example, PLMN information may be stored in the SIM 140 and network access (history) information may be stored in the memory 120 (e.g., the first database 121), or a part of the network access information may be stored in the SIM 140, or data stored on the SIM 140 may be entirely stored in the memory 120. The processor 110 may read desired information from at least one of the memory 120 or the SIM 140. In various embodiments of the present disclosure, various methods of using data stored in the SIM 140 may be replaced with various methods of using data stored in the memory 120 (e.g., the first database 121 or the second database 123) or vice versa.

The input/output interface 150 may serve to transfer an instruction or data input from a user or another external device to (an)other element(s) of the electronic device 100. Furthermore, the input/output interface 150 may output instructions or data received from (an)other element(s) of the electronic device 100 to the user or another external device.

The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

Figure 2:
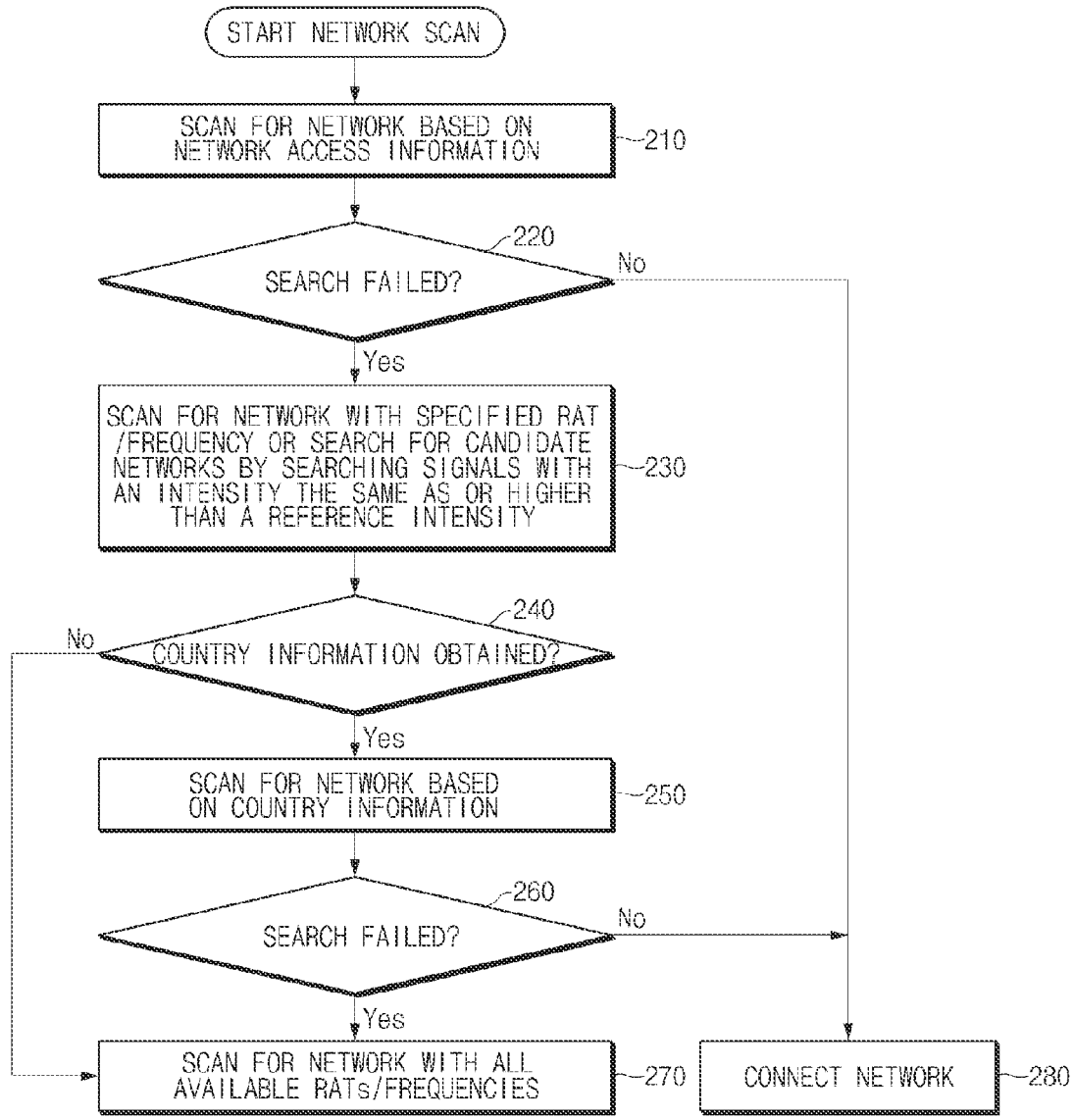
FIG. 2 is a flowchart illustrating a process of a network selecting method according to an embodiment of the present disclosure.

FIG. 2 is a flowchart illustrating an exemplary process of a network selecting method according to an embodiment of the present disclosure.

Referring to FIG. 2, in operation 210, the electronic device 100 may search (scan) for a currently accessible network based on network access information. Operation 210 may be performed in various situations. For example, operation 210 may be performed when the electronic device 100 is turned on, or a flight/airplane mode of the electronic device 100 is released, or the electronic device 100 desires to check an accessible network while moving from an OOS region to another region. Besides, operation 210 may also be performed in the case where a network connection is re-established in a state where the network connection is released by the user. Further, operation 210 may also be performed in the case where a network search is manually performed by the user. In other words, various network scan methods disclosed herein may be applied in the above-mentioned various situations. The terms "network search (detection)". "network scan", "frequency scan", "wireless resource search", or the like used herein may be construed as an operation of checking a frequency band and RAT accessible by an electronic device.

In operation 210, the electronic device 100 may determine a network that the electronic device is to preferentially attempt to access, based on PLMN information and previously accessed network history information stored in the SIM 140 or the memory 120. For example, the electronic device 100 may perform a network scan for accessing a lastly accessed network. For example, in the case where the user returns to Korea after visiting Japan and China with the electronic device 100, if the electronic device 100 is turned on in Korea, the electronic device 100 may scan for a lastly accessed Chinese network based on an access history.

In the above mentioned example, since the electronic device 100 is located in a region (i.e., Korea) in which a Chinese network is not supported, the electronic device 100 may fail in a network search (e.g., available PLMN search) through a network scan based on a lastly accessed network history. The SIM 140 or the memory 120 may include a plurality of pieces of network access information. For example, the SIM 140 or the memory 120 may include network history information for each network accessed in China-Japan-Korea and operator network information (e.g., home network) of a country where the electronic device 100 has been initially activated. The electronic device 100 may perform a network scan based on network access history or home network (e.g., a communications operator network of Korea) information stored in the SIM 140 or the memory 120 or network information set by a user/manufacturer. The plurality of pieces of network access information (e.g., PLMN, etc.) stored in the SIM 140 or the memory 120 may be prioritized, and the electronic device 100 may perform a network scan according to a priority order. In other words, operation 210 may be performed repeatedly.

In operation 220, the electronic device 100 may determine whether a network search performed based on the network access information stored in the SIM 140 or the memory 120 fails. If the network search is successful, the electronic device 100 may be registered with a corresponding operator network so that a network-related function may be used. In the case where the network search fails, for example, in the case where the electronic device 100 is located in a region where a network included in the network access history or network access information is not supported, such as the U.S. or Europe other than China, Japan, or Korea, the network search of operation 210 may fail.

In operation 230, the electronic device 100 may scan for a network which is usable with a specified RAT and a specified frequency. For example, the electronic device 100 may scan for a network using GSM network frequency 850 MHz or WCDMA 2100 MHz widely used in the world. Operation 230 may be performed repeatedly. For example, the electronic device 100 may preferentially search for WCDMA 2100 MHz, and, if the search fails, may search for GSM 850 MHz.

In operation 230, the electronic device 100 may configure a scan list according to a RAT and a frequency band for the purpose of efficient network search. For example, the list may include at least one RAT and frequency band. In one embodiment of the present disclosure, the electronic device 100 may select, from the list, RATs and frequency bands in descending order of global coverage and may perform a scan. In this case, the electronic device 100 may obtain country information through a first or second scan based on the scan list in a situation of roaming in most countries.

In operation 230, the electronic device 100 may scan for a network in a different manner from that of operation 210 (or operation 250 or 270) in order to quickly obtain country information. For example, the electronic device 100 may perform PLMN detection with respect to only a limited number of candidates in descending order of signal intensity (e.g., highest ranked one or two) among candidates found when a power scan is performed. Here, the power scan may be construed as an operation of searching for signals with a reference intensity or higher instead of searching for a PLMN with respect to all absolute radio-frequency channel numbers (ARFCNs). By performing the power scan, the electronic device 100 may check existence of a signal and a signal intensity. In other words, the electronic device 100 may perform the PLMN detection with respect to candidates selected in descending order of signal intensity among candidates found through the power scan.

In the case of a typical GSM network scan, it may take about 15 seconds to perform the PLMN detection with respect to about 150 candidates. However, if the PLMN detection is performed with respect to highest ranked five candidates through a network scan (e.g., a quick scan) according to operation 230, a network scan may be completed within one second. In other words, the electronic device 100 may obtain country information within one second in operation 230, and may perform next operations.

In operation 240, the electronic device 100 may determine whether country information is obtained as a result of the network scan of operation 230. In operation 230, the electronic device 100 may obtain PLMN information (code) which includes MCC information. The MCC information may correspond to country information in various embodiments of the present disclosure.

In one embodiment of the present disclosure, when the electronic device 100 attempts to perform roaming in Germany, if there is no information on a network accessed in Germany in a recent network access history or there is no additionally set/registered German network information. i.e., if the network search of operation 210 fails, the electronic device 100 may scan for a communication network that supports WCDMA 2100 MHz in operation 230. As a result of a scan, the electronic device 100 may obtain network identification information (e.g., PLMN) such as 26202 (Vodafone), 26203 (E-Plus), or 26207 (O2). The electronic device 100 may obtain country information (e.g., MCC) from the network identification information. In the case of the above-mentioned example, the processor 110 may obtain MCC "262" from the network identification information, and may determine that the country information is "Germany" by comparing the MCC "262" with the first database 121 of the memory 120. If the electronic device 100 succeeds in obtaining the country information as described above, the electronic device 100 may perform operation 250. However, if obtaining the country information with a specified RAT and frequency fails, the process may proceed to operation 270 so that a full scan for all networks may be performed with all available frequencies.

In one embodiment of the present disclosure, if a roaming situation is confirmed in operation 240, the electronic device 100 may determine whether a PLMN obtained through the network scan of operation 230 is available. If the PLMN is available, the electronic device 100 may skip operations 250 and 260 and may perform operation 280.

In operation 250, the electronic device 100 may perform a network search (network selection) based on the country information obtained in operations 230 and 240. For example, if a country corresponding to a home network is different from a country corresponding to the country information, the electronic device 100 may determine that the electronic device 100 is currently in a roaming state. The electronic device 100 may obtain, from the first database 121, a RAT (e.g., $2^{nd}$ generation (2G) (GSM), $3^{rd}$ generation (3G), WCDMA, time division synchronous code division multiple access (TD-SCDMA), $4^{th}$ generation (4G) (LTE, worldwide interoperability for microwave access (WiMAX), evolved high speed packet access (HSPA+)), etc.) provided from a corresponding country and frequency information (e.g., 900/1800 MHz, 2100 MHz, or 800/1800/2600 MHz) corresponding to each RAT. For example, the electronic device 100 may determine an LTE band to be detected based on the country information. As described above, the electronic device 100 may configure a network scan target based on the country information, and may quickly perform a scan with respect to the configured target. Detailed operations related to operation 250 will be described with reference to FIG. 3.

In operation 260, the electronic device 100 may determine whether the network scan of operation 250 is successful. If the network scan is successful, the electronic device 100 may perform a connection operation with respect to at least one of found networks. However, if the network scan fails, the electronic device 100 may perform a full scan for networks in operation 270.

Figure 3:
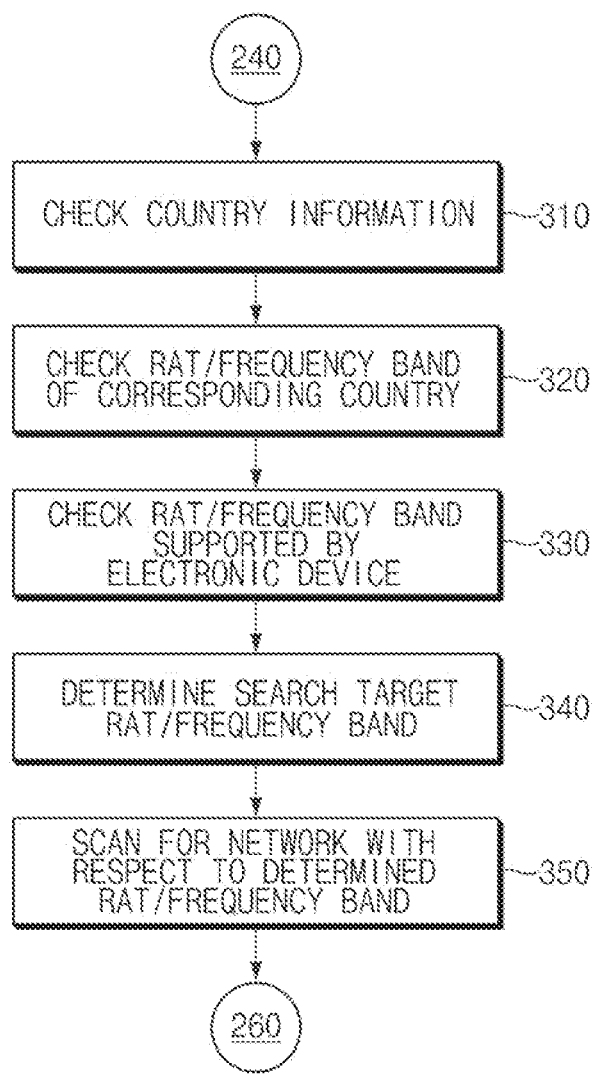
FIG. 3 is a flowchart illustrating a process of a network search based on country information according to an embodiment of the present disclosure.

FIG. 3 is a flowchart illustrating a process of a network search based on country information according to an embodiment of the present disclosure.

In one embodiment of the present disclosure, the process of FIG. 3 may be construed as sub operations of operation 250. In other words, a network search operation based on country information, which may be performed between operation 240 and operation 260, may be performed as the process of FIG. 3. However, in various embodiments of the present disclosure, the process of FIG. 3 may be applied in a specific step of various processes in which a network search operation based on country information is performed.

Referring to FIG. 3, in operation 310, the electronic device 100 may check country information by comparing a network scan result with the first database 121. In operation 320, the electronic device 100 may check a RAT and supported band information of a corresponding country. For example, in the case where the country information indicates Germany, the electronic device 100 may determine that wireless resources of GSM 900 MHz, GSM 1800 MHz, WCDMA 2100 MHz, LTE band 3 (1800 MHz), band 7 (2600 MHz), and band 20 (800 MHz) are supported in Germany.

In operation 330, the electronic device 100 may check a frequency band supported by the electronic device 100. For example, the electronic device 100 may check a RAT supported by the communication module 130 and a frequency band in which signals can be transmitted/received by at least one antenna connected to the communication module 130. For example, the electronic device 100 may check information indicating that the communication module 130 supports GSM, WCDMA, and TD-SCDMA but does not support LTE, and the antenna installed in the electronic device 100 is unable to receive signals of a frequency band of 1 GHz or lower.

In the case where a wireless resource supportable by the electronic device 100 is fixed, operation 330 may be skipped. However, in the case where a supportable wireless resource is variable for various reasons, for example, in the case where use of LTE is prohibited by setting software in the electronic device 100, or a frequency band for signal reception is able to be extended by connecting a special case or antenna to the electronic device 100, the electronic device 100 may determine a supportable RAT and frequency band. In one embodiment of the present disclosure, since a network scan in a roaming situation is performed when the user of the electronic device 100 arrives at an airport and turns on the electronic device 100, operation 330 may be performed in advance during a process of initializing elements of the electronic device 100.

In operation 340, the electronic device 100 may determine a RAT and a frequency band for which a network search is to be performed. With reference to the above-mentioned example, the electronic device 100 may determine, as a network search target, GSM 1800 MHz and WCDMA 2100 MHz supported by the electronic device 100 among networks accessible in Germany.

In operation 340, the electronic device 100 may use additional information in order to determine the network search target. For example, in the case of Germany, there are 31 MNCs corresponding to the MCC 262. In other words, 31 PLMN codes exist. If information indicating that an operator which has made a roaming contract with the home network of the electronic device 100 is Vodafone exists in the SIM 140 of the electronic device 100, the electronic device 100 may determine to perform a network scan with respect to a network (RAT and frequency) supported by Vodafone among networks supported in Germany. The electronic device 100 may check a network connection condition (e.g., whether a network of Vodafone) for a PLMN found during a scan operation. For example, in the case where found network identification information is PLMN code 26202 of the operator Vodafone, the electronic device 100 may determine to attempt a network connection for the corresponding PLMN.

In operation 350, the electronic device 100 may perform a network search with respect to a RAT and a frequency band determined as a result of operation 340. The electronic device 100 may determine whether a found network is accessible in a following process (e.g., after operation 260). For example, the electronic device 100 may determine whether a found network is a network of an operator enabling PLMN selection, and may attempt to access the network.

Figure 4:
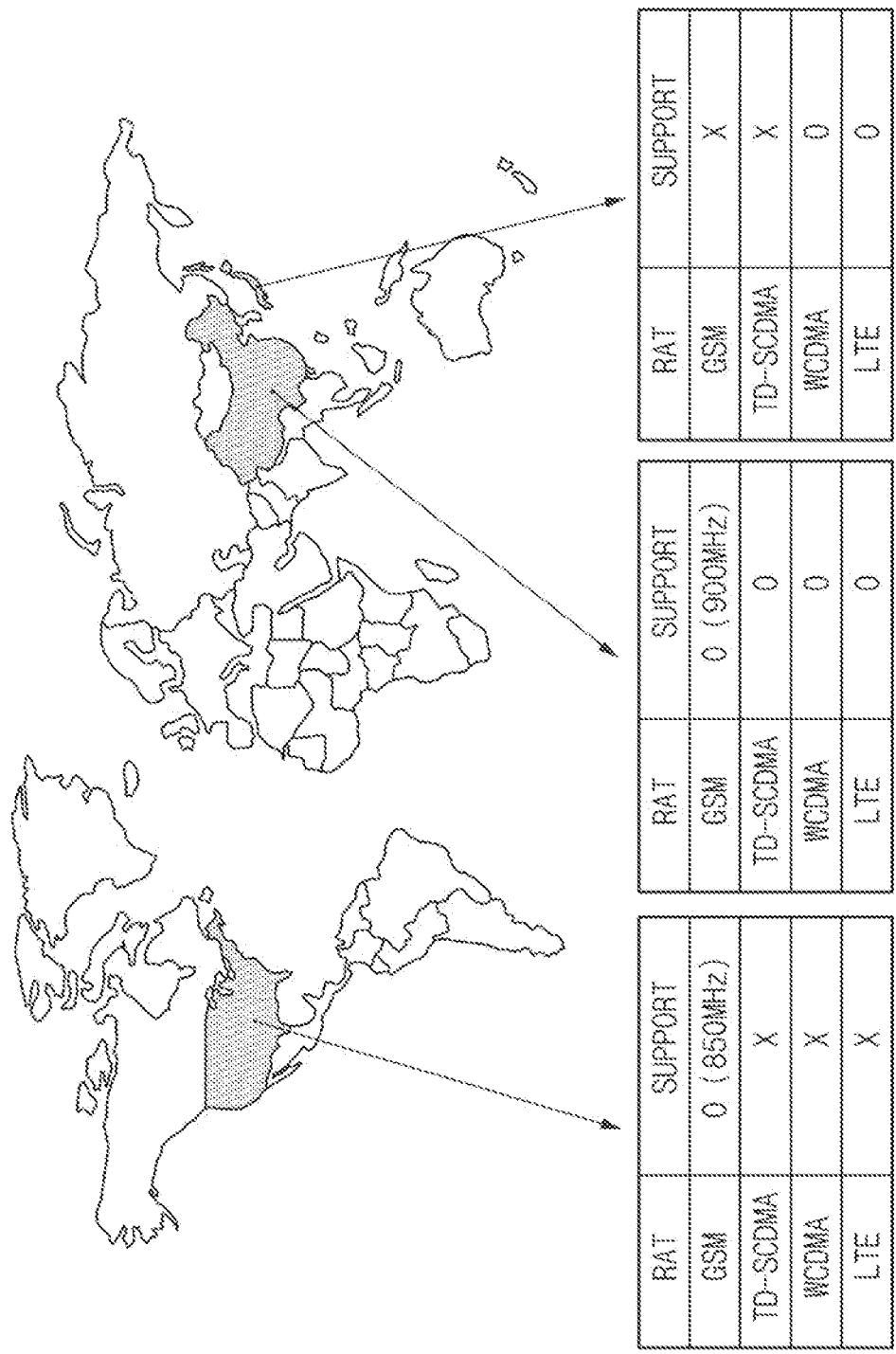
FIG. 4 illustrates a current state of network support in each country according to an embodiment of the present disclosure.

FIG. 4 illustrates a current state of network support in each country according to an embodiment of the present disclosure.

Referring to FIG. 4, the user who has activated the electronic device 100 in Korea may travel to China, Japan, US, Europe, etc. If the user moves to Japan, the electronic device 100 may attempt to access a network in Japan. If there is no history of accessing a network of Japan by the user, i.e., if an access database stored in the SIM 140 or the memory 120 does not contain access information of a communications operator network available in Japan, the electronic device 100 may determine that a current situation requires roaming, and may perform a network search method disclosed in the present disclosure instead of performing a full scan for all detectable networks.

For example, the electronic device 100 may perform a search with a specified frequency for a specified RAT. For example, the electronic device 100 may obtain information indicating that a current location of the electronic device 100 is Japan by performing a network scan with respect to a WCDMA 2100 MHz band. In other words, the communication module 130 may collect PLMN information through a search for a WCDMA network, and the processor 110 (or the communication module 130) may check country information by analyzing MCC information included in the collected PLMN information.

If the country information is confirmed as Japan, the electronic device 100 may perform a network search based on the country information. In the example of FIG. 4, since GSM and TD-SCDMA are not supported in Japan, frequency bands corresponding to GSM and TD-SCDMA may be excluded from a scan list. In the example of FIG. 4, WCDMA and LTE networks are available in Japan, and the electronic device 100 may perform, based on this information, a network scan with respect to a supported RAT and frequency band. For example, in the case where the electronic device 100 does not support LTE (e.g., in the case where the communication module 130 does not support LTE, or a user setting or a rate payment system to which the user subscribes forces use of a 3G network alone even if the communication module supports LTE, or a roaming contract is established only for 3G/2G networks), the electronic device 100 may perform a scan with respect to a frequency band of WCDMA. The electronic device 100 may determine available network identification information among obtained pieces of network identification information, and may access a corresponding network. As described above, the electronic device 100 may further limit a search range using information of a Japanese communications operator which has made a roaming contract with the home network operator of the electronic device 100. By virtue of such operation, a time taken for accessing a network may be reduced compared to that of a case where a network connection attempt is performed through a full scan for all available networks.

For another example, if the user of the electronic device 100 moves to China, the electronic device 100 may determine that a current location of the electronic device 100 is China based on information obtained by performing a network search with respect to a WCDMA 2100 MHz band. If a Chinese communications operator which has made a roaming contract with the home network operator (e.g., Korean communications operator) of the electronic device 100 is China Telecom, the electronic device 100 may obtain, from information stored in the database 121, information indicating that the China Telecom supports LTE or 2G networks. Therefore, the electronic device 100 may perform a network search with respect to 2G (GSM 900 MHz) and 4G (LTE band 41) excepting a 3G network. The electronic device 100 may select a PLMN of the China Telecom from a result of this search.

For another example, the electronic device 100 may be located in the U.S. If the SIM 140 (or the second database 123) of the electronic device 100 does not contain access information of a network available in the U.S., the electronic device 100 may perform a search with respect to a specified frequency band of a GSM or WCDMA network as described above with respect to operation 230. If the electronic device 100 performs a network search with respect to a GSM 900 MHz band, the electronic device 100 may fail in the network search since the US does not support GSM 900 MHz. In this case, the electronic device 100 may repeat operation 230 according to a predetermined order or a priority order. For example, the electronic device 100 may scan for GSM 900 MHz, and then may scan for GSM 850 MHz, and then may scan for WCDMA 2100 MHz. In this case, the electronic device 100 may obtain country information (i.e., the US) from a result of scan for GSM 850 MHz. The process after operation 250 may be performed based on this country information.

Figure 5:
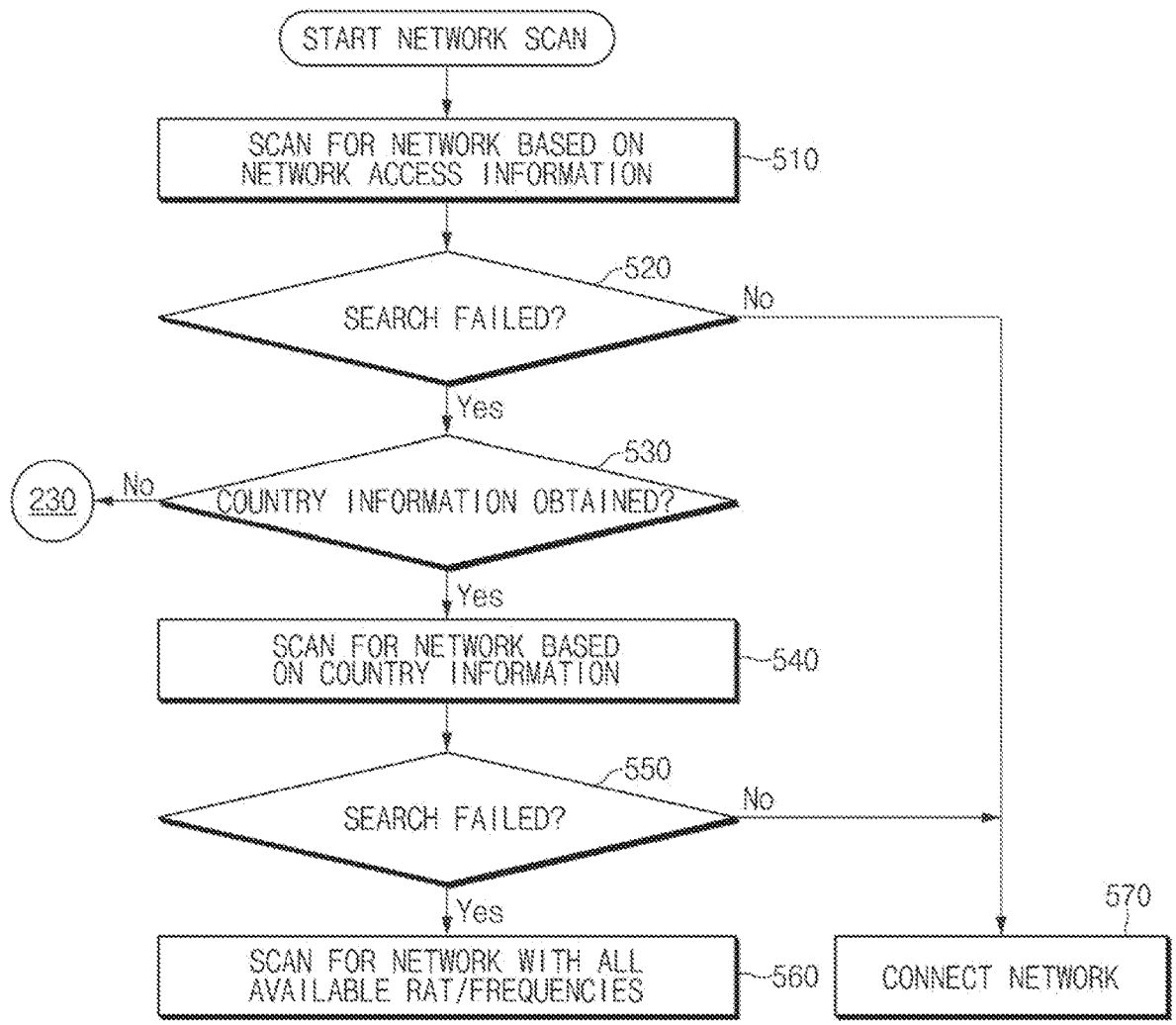
FIG. 5 is a flowchart illustrating another process of a network selecting method according to an embodiment of the present disclosure.

FIG. 5 is a flowchart illustrating another process of a network selecting method according to an embodiment of the present disclosure. Descriptions of FIG. 5 and following FIGS. 6 and 7 which overlap with, or correspond to or are similar to the above descriptions may not be provided below.

Referring to FIG. 5, in operation 510, the electronic device 100 may perform a network connection based on network access information. The electronic device 100 may perform a network scan based on home PLMN (HPLMN), RPLMN, equivalent HPLMN (EHPLMN), user controlled PLMN, operator controlled PLMN, etc. stored in the SIM 140. In this operation, if an accessible PLMN is discovered, the electronic device 100 may register with the PLMN. This procedure may be construed as corresponding to operation 210 and operation 280.

In operation 520, the electronic device 100 may determine whether the network scan of operation 510 is successful or has failed. If the network scan is successful, in operation 530, the electronic device 100 may determine whether country information is obtained as a result of operation 510.

For example, in operation 510, the electronic device 100) may search for an available PLMN using network access information (e.g., home network, recently accessed network, etc.) stored in the SIM 140 or the memory 120. In this case, even if the search for the available PLMN fails, the electronic device 100 may obtain MCC information if another PLMN is discovered. For example, in the case where the electronic device 100 is a terminal for a Korean communications operator, and the user has been to Japan and China, the SIM 140 may store information on a channel of LTE band 3 of Korea, a channel of WCDMA band 1 of China, and a channel of WCDMA band 4 of Japan. If the user moves again from Korea to China with the electronic device 100, an RPLMN is not discovered since it is set as a Korean operator, but a PLMN of China may be discovered. Even if the discovered PLMN of China is not an available PLMN, the electronic device 100 MCC from corresponding network identification information. As described above, if it is determined that country information has been obtained in operation 530, the electronic device 100 may skip a network search (e.g., operation 230) for obtaining country information through a specified RAT/frequency band. If it is determined that the country information has not been obtained in operation 530, the electronic device 100 may perform the process after operation 230. In this case, the process of FIG. 2 may be construed as substantially the same as that of FIG. 5.

If it is determined that the country information has been obtained in operation 530, the electronic device 100 may perform operations 540 to 570. Operations 540, 550, 560, and 570 may respectively correspond to operations 250, 260, 270, and 280 of FIG. 2. In the embodiment of FIG. 5, operations 230 and 240 of FIG. 2 for scanning for a specified RAT/frequency band to obtain country information and determining whether the country information is obtained may be skipped, so that network access may be performed relatively quickly in a situation in which roaming is required.

Furthermore, in one embodiment related to FIG. 5, in the case where network identification information (PLMN) available in a country in which the electronic device 100 is determined as being located is not obtained as a result of the network scan of operation 510 based on network access information, and network access information stored in the SIM 140 (or the memory 120) does not include the country (i.e., in the case where the country has not been visited, or information on the country is not set), the electronic device 100 may stop the search of operation 510 and may proceed to operation 230.

Figure 6:
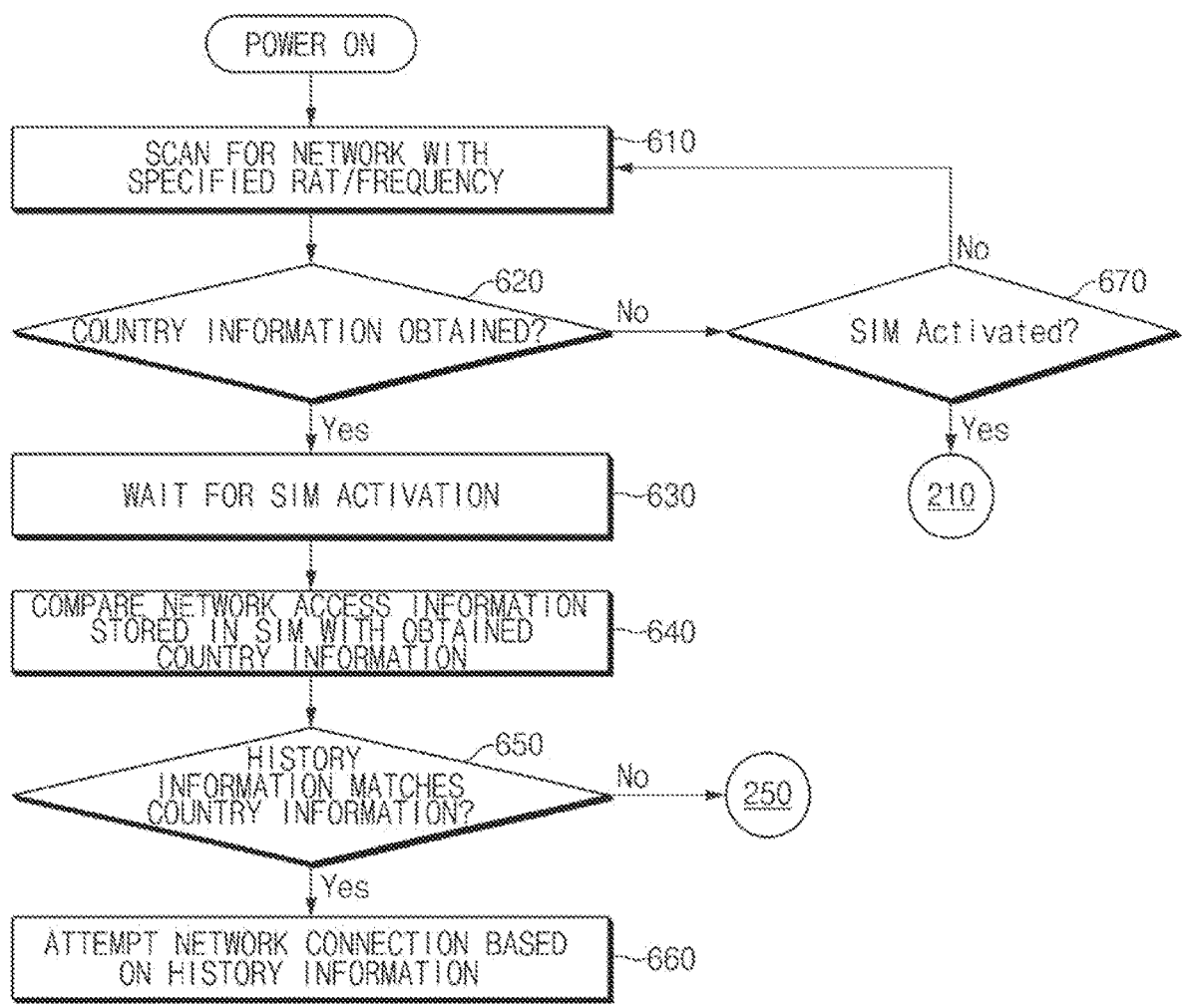
FIG. 6 is a flowchart illustrating a network search process performed prior to activation of a subscriber identification module (SIM) according to an embodiment of the present disclosure.

FIG. 6 is a flowchart illustrating a network search process performed prior to activation of a SIM according to an embodiment of the present disclosure.

Referring to FIG. 6, if power of the electronic device 100 is turned on, the electronic device 100 may search for and enable hardware elements connected to the processor 110. For example, in the case where the electronic device 100 is in a flight/airplane mode, the processor 110 and the SIM 140 of the electronic device 100 remain connected, but the communication module 130 is cut off from power supply and is in a disabled state (disconnected state). That is, once the flight/airplane mode is released, the electronic device 100 may immediately access the SIM 140, so that there may be no substantial difference between a flight/airplane mode release time and a time at which the information stored in the SIM 140 becomes accessible. However, in the case where the power of the electronic device 100 is switched from a turned-off state to a turned-on state, the processor 110 may perform a scan operation for checking elements of the electronic device 100. Therefore, there may occur a difference between a power-on time and a time at which the SIM 140 is activated and the information stored in the SIM 140 becomes accessible.

If the electronic device 100 is turned on, the electronic device 100 may perform a network search with respect to a preset RAT and frequency band in operation 610. For example, the communication module 130 or the processor 110 may be configured to perform operation 610 at a power-on time of the electronic device 100.

In one embodiment of the present disclosure, in order not to affect a time of network access using the SIM 140, operation 610 may be performed before the SIM 140 is activated, and, after activation of the SIM 140, different processes may proceed according to a result of operation 610.

For example, if country information is obtained, in operation 620, prior to the activation of the SIM 150 as a result of the scan of operation 610, the electronic device 100 may wait for the activation of the SIM 140 in operation 630. If obtaining the country information prior to the activation of the SIM 140 fails, the process after operation 210 of FIG. 2 may be performed if the SIM is determined at operation 670 to be activated. In this case, a process which is substantially the same as the process described above with reference to FIG. 2 may follow. If the SIM is determined at operation 670 to not be activated, the process returns to operation 610.

If the SIM 140 is activated, the electronic device 100 may compare, in operation 640, the network access (history) information stored in the SIM 140 with the country information obtained in operation 610. If the access (history)

information matches the country information in operation 650, the electronic device 100 may attempt a network connection based on the network access (history) information in operation 660. For example, the electronic device 100 may perform a network connection using channel information and MCC/MNC of RPLMN.

In the case where the history information does not match the country information in operation 650, the electronic device 100 may be in a situation in which roaming is required, and, in this case, the electronic device 100 may perform a network search based on the country information obtained in operation 610. For example, the process after operation 250 may be performed. According to the embodiment of FIG. 6, compared to the process of FIG. 2, operations 230 and 240 are performed in advance prior to operation 210 which is performed after the SIM 140 is activated, so that a time taken for the electronic device 100 to access a network may be reduced accordingly.

Figure 7:
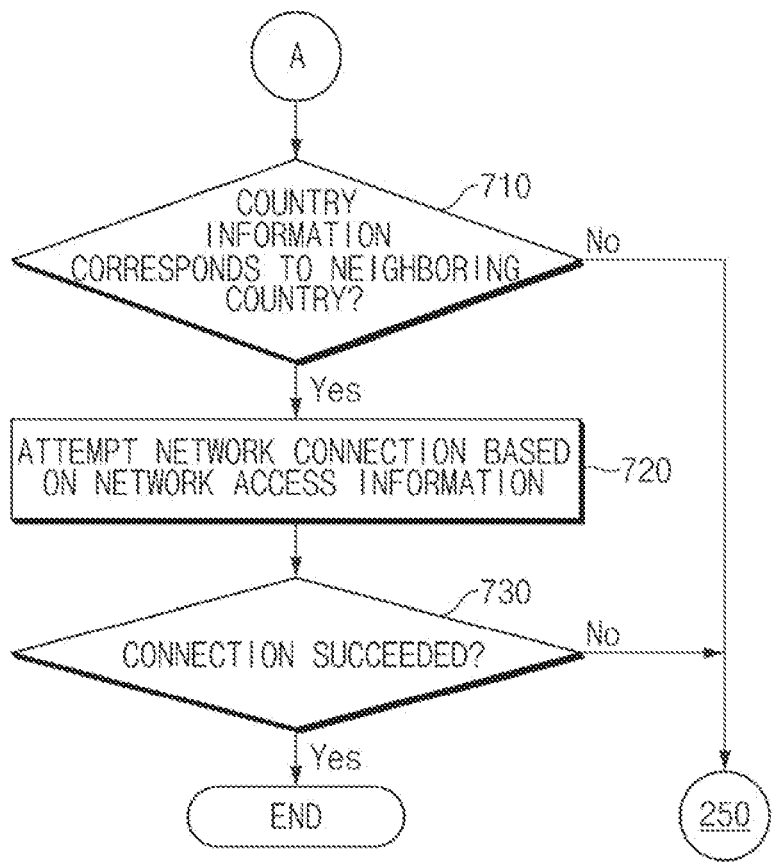
FIG. 7 is a flowchart illustrating a network search process performed in consideration of neighboring countries according to an embodiment of the present disclosure.

FIG. 7 is a flowchart illustrating a network search process performed in consideration of neighboring countries according to an embodiment of the present disclosure.

Referring to FIG. 7, there may occur a case in which country information of country A is obtained as a result of operation 610 of FIG. 6, but the process proceeds from 650 to operation 250 since previous access information (e.g., network access information stored in the SIM 140) matched to the country A does not exist. In other words, the country information may be obtained before the SIM 140 is activated, but an access history matched to the country information may not be detected after the SIM 140 is activated, and thus a network search may be performed based on the obtained country information. In this case, a network connection procedure based on previous access information of the SIM 140 may be skipped.

In the case where the country A is a neighboring country of country B and such a phenomenon (phenomenon in which the country information of the country A is obtained) occurs in the vicinity of the border of the country B, for example, in the case where the electronic device 100 is actually located in the country B and previous access information corresponding to the country B is stored in the SIM 140, the electronic device 100 may spend a substantial amount of time to search for a network using the country information of the country A even though the electronic device 100 is able to quickly access a network of the country B using the previous access information stored in the SIM 140. In order to prevent this situation, in operation 710, the electronic device 100 may determine whether the country information obtained in operation 510 corresponds to a neighboring country of at least one other country. Operation 710 may be performed, for example, before the process proceeds from operation 650 to 250. For example, the electronic device 100 may additionally store, in the memory 120, a database of countries which border each other. Alternatively, this database may be included in the database 121. If it is determined that the obtained country information corresponds to a neighboring country of a country included in the previous access information, the electronic device 100 may attempt a network connection based on network connection information (e.g., RPLMN or HPLMN stored in the SIM 140) in operation 720. If the obtained country information does not correspond to the previous access information nor corresponds to a neighboring country of a country included in the previous access information, the electronic device 100 may perform a network search (e.g., operation 250) based on the obtained country information as described above.

If the connection attempt of operation 720 is successful, the electronic device 100 may end the network search process. If it is determined in operation 730 that a network connection has failed, the electronic device 100 may be actually located in a neighboring country area (e.g., the country A), and, accordingly, the electronic device 100 may perform a network search based on corresponding country information in operation 250.

Network search methods have been described using cellular networks (2G/3G/4G etc.) as main examples. However, there may exist various methods for obtaining country information, and a cellular network may not be necessarily used. For example, in the process of FIG. 2, the electronic device 100 may perform the network scan of operation 230 with respect to a certain frequency of another RAT instead of a frequency of GSM or WCDMA. For example, the electronic device IN) may obtain adjacent Wi-Fi information using information indicating that a RAT is Wi-Fi and a frequency is 2.4 GHz or 5 GHz. In particular, a place where arrival at or departure from a country frequently occurs, such as an airport, provides a Wi-Fi service. Therefore, in the case where the database 121 of the memory 120 stores Wi-Fi network identification information for each airport and country information corresponding to the Wi-Fi network identification information, the electronic device 100 may obtain, in operation 230, country information using Wi-Fi or using Wi-Fi and a cellular network in combination.

Furthermore, in operation 610 of FIG. 6 in which a network search is performed within a limited time (prior to activation of a SIM), the electronic device 100 may obtain country information through a Wi-Fi scan for which a relatively small amount of RATs and search target frequencies is required compared to another RAT (e.g., 3G, LTE, etc.). The electronic device 100 may obtain country information or perform a network connection operation using a cellular network in a following process.

Information on a RAT and a band (frequency band) supportable in a country may be changed for various reasons. For example, the first database 121 may have stored network information available in China. In other words, information on RATs available in China and a frequency band for each RAT may have been stored in the first database 121. However, the network information available in China may be changed due to a change in communications operators of China or a communications policy or frequency auction of China.

In order to reflect such a change, once the electronic device 100 obtains a normal service by accessing a certain network (e.g., a network different from a previously accessed network), the electronic device 100 may request and receive, from the accessed network, information on a frequency band and/or RAT for a corresponding country (or a corresponding communications operator). The electronic device 100 may update a database (e.g., the first database 121) if there is a change in frequency band or RAT information as a result of comparing the received information with the database.

In an embodiment of the present disclosure, the electronic device 100 may update a database through a periodic network search. For example, the electronic device 100 may drive a timer having a fixed period. If the timer expires, the electronic device 100 may cause the communication module 130 to search for an adjacent network. If it is determined that there is a frequency band different from that stored in an existing database as a result of the search, the electronic device 100 may send, to a corresponding network, a request for up-to-date network information supported in a corresponding country. If the up-to-date network information is obtained, the electronic device 100 may update the existing database.

Figure 8:
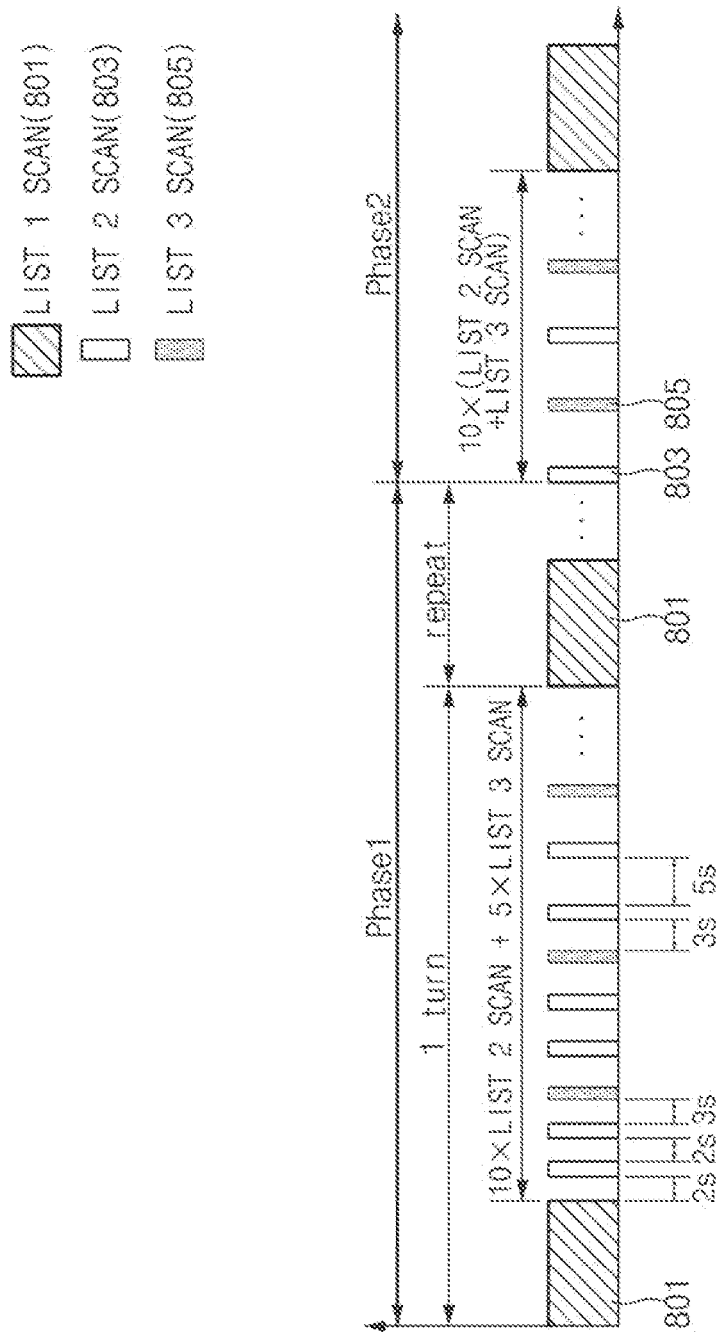
FIG. 8 is a timing diagram of a network search in which a plurality of scan lists are used according to an embodiment of the present disclosure.

FIG. 8 is a timing diagram of a network search in which a plurality of scan lists are used according to an embodiment of the present disclosure.

Referring to FIG. 8, an OOS situation of the electronic device 100 may occur if the electronic device 100 is located in a shadow zone such as an elevator or a basement of a building. According to an embodiment of the present disclosure, the electronic device 100 may perform a network scan for reducing power consumption by shortening a network search time in this OOS situation according to a method illustrated in FIGS. 8 and 9.

The electronic device 100 may include a first list (LIST 1) 801 including information on all wireless communication resources supportable by the electronic device 100, i.e., RATs and frequency bands (or channels). The first list 801 (and a second list 803 and a third list 805 described below) may be stored in at least one of the memory 120 or the SIM 140.

The electronic device 100 may store cell information (e.g., RAT and channel information) that has been accessed before. This cell information may correspond to the above-mentioned previously accessed network history information stored in the SIM 140 or the memory 120. The cell information stored in the electronic device 100 may correspond to the second list (LIST 2) 803 of FIG. 8.

In FIG. 8, the third list (LIST 3) 805 may include information on a specified RAT and specified frequency band. For example, the third list 805 may include information on GSM network frequencies GSM 850 MHz and GSM 900 MHz or WCDMA 2100 MHz widely used in the world.

In one embodiment of the present disclosure, the first, second, and third lists 801, 803, and 805 may include PLMN information (e.g., RPLMN information for the second list 803) corresponding to a wireless communication resource included in each list.

The electronic device 100 may schedule a network scan to be performed when entering the OOS state, as illustrated in FIG. 8. For example, during one cycle, a network scan for the first list 801, a network scan for the second list 803, and a network scan for the third list 805 may be performed according to a specified schedule. FIG. 8 illustrates one scheduling. For example, after a network scan is performed based on the first list 801, two times of a network scan based on the second list 803 and then one time of a network scan based on the third list 805 (e.g., a first schedule) may be repeatedly performed. However, this is merely an example, and the scans for the second and third lists 803 and 805 may be performed alternately, or the scan for the third list 805 may be repeatedly performed after the scan for the second list 803 is repeatedly performed. An interval (e.g., a sleep duration) between network scan timings for respective lists may be constant within one cycle, or may gradually increase within one cycle, or may vary with a set schedule.

In one embodiment of the present disclosure, the electronic device 100 may repeat a network scan (e.g., a first scan) according to the first schedule a specified number of times. In one embodiment of the present disclosure, since a full scan based on the first list 801 causes a large amount of battery power consumption and takes a long search time, the full scan may be set to be performed only one time when the first schedule is performed one time. On the contrary, a scan (e.g., a second scan) based on the second list 803 or a scan (e.g., a third scan) based on the third list 805 is performed with respect to only limited target wireless resources, those scans may be repeated multiple times within one schedule.

In the case where the first scan has been repeated a specified number of times, but the electronic device 100 still remains in the OOS state, the electronic device 100 may perform a network scan (e.g., the second scan) using a second schedule different from the first schedule. The second scan may have scan timings with a relatively long interval since it is highly possible that the electronic device 100 will remain for a while in a region where a network is not available.

Figure 9:
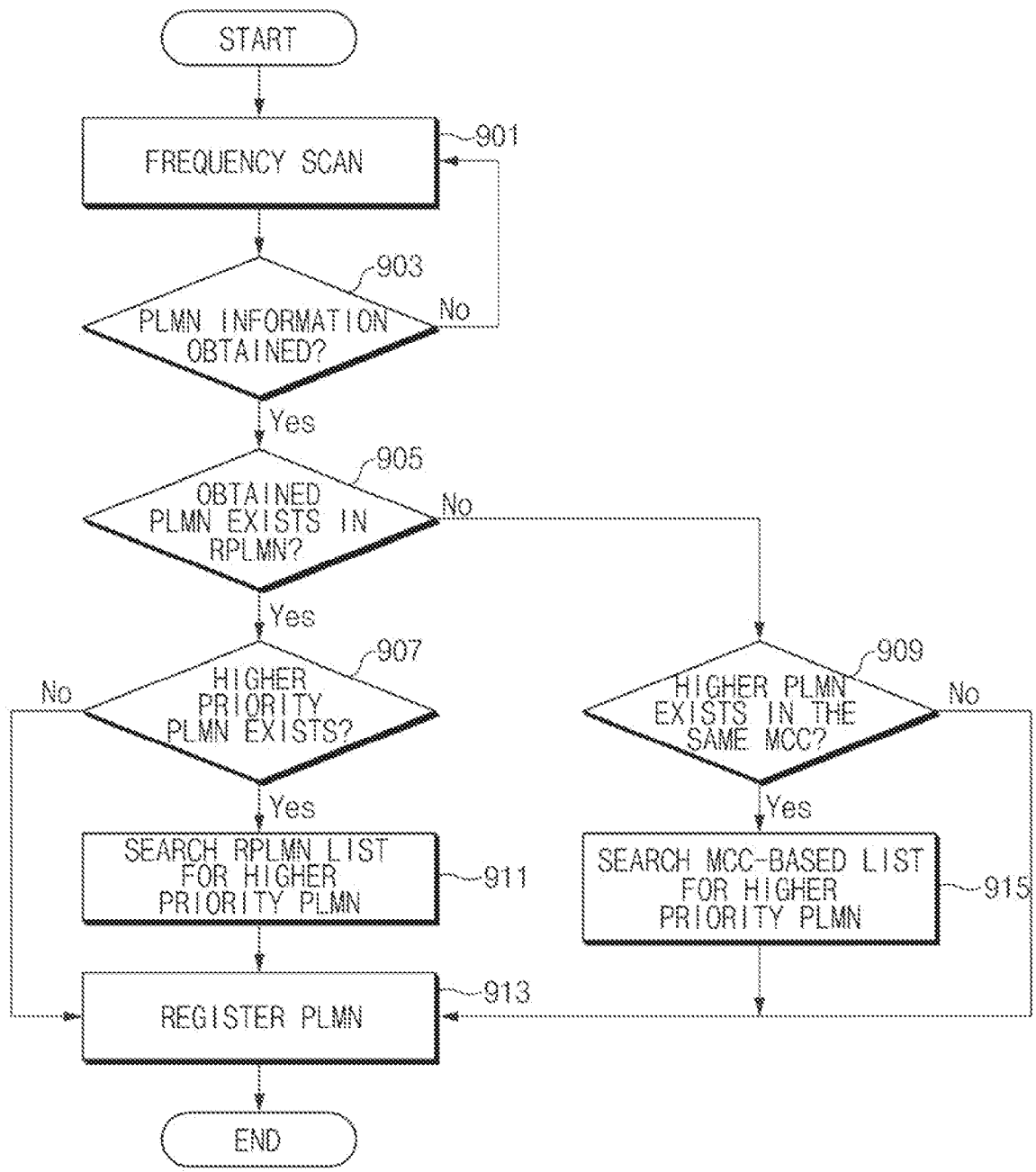
FIG. 9 is a flowchart illustrating a network search process performed using a plurality of scan lists according to an embodiment of the present disclosure.

FIG. 9 is a flowchart illustrating a network search process performed using a plurality of scan lists according to an embodiment of the present disclosure.

Referring to FIG. 9, in operation 901, the electronic device 100 may perform a network (frequency) scan corresponding to frequencies included in a plurality of scan lists. For example, the electronic device 100 may set a first schedule which defines network scan timings respectively for the first, second, and third lists 801, 803, and 805, and may perform the network scan at least one time based on the first schedule. In operation 903, the electronic device 100 may determine whether PLMN information is obtained from the network scan. If obtaining the PLMN information fails, the electronic device 100 may repeat operation 901 until the PLMN information is obtained. In this case, if obtaining the PLMN information fails even though the network scan has been performed at least a specified number of times using the first schedule, the electronic device 100 may change a schedule used in operation 901 from the first schedule to a second schedule.

If the PLMN information is obtained, the electronic device 100 may check country information (MCC) from the obtained PLMN information. If the country information is checked, the electronic device 100 may perform a network scan with respect to a RAT and frequency band set based on the MCC, using any one of the methods described above with reference to FIGS. 1 to 7, and may perform registration of PLMN based on a result of the scan.

In one embodiment of the present disclosure, if the PLMN information is obtained, the electronic device 100 may determine whether the PLMN has been obtained from an RPLMN list, for example, the second list 803 in operation 905. For example, the electronic device 100 may determine whether the obtained PLMN information exists in the RPLMN list. In the case where the PLMN obtained as a result of executing the first schedule is a PLMN obtained from the second list 803, the electronic device 100 may determine whether a PLMN with a higher priority than that of the obtained PLMN exists in the second list 803 in operation 907. If there is no PLMN with a higher priority, the electronic device 100 may perform registration of a current PLMN (the obtained PLMN) in operation 913. If there is a PLMN with a higher priority, the electronic device 100 may search for, in operation 911, a PLMN with a higher priority among PLMNs (e.g., RPLMN) included in the second list 803, and may perform registration of a discovered PLMN in operation 913. If the electronic device 100 fails in the search, the electronic device 100 may perform registration of the PLMN obtained in operation 903.

In one embodiment of the present disclosure, in the case where the PLMN obtained as a result of executing the first schedule is not a PLMN obtained from the second list 803, i.e., in the case where the PLMN obtained as a result of executing the first schedule is a PLMN obtained from the first or third list 801 or 805, the electronic device 100 may determine in operation 909 whether a PLMN with a higher priority exists in the same MCC (i.e., the same country) based on the MCC information of the obtained PLMN. If there is no PLMN with a higher priority, the electronic device 100 may perform registration of a current PLMN (the obtained PLMN) in operation 913. If there is a PLMN with a higher priority, the electronic device 100 may newly set a search list based on the MCC in operation 915. For example, the electronic device 100 may set a list including information on a RAT and frequency band available in a country corresponding to the MCC and, at the same time, supportable by the electronic device 100. The electronic device 100 may search for a PLMN with a higher priority based on the list newly set in operation 915.

Figure 10:
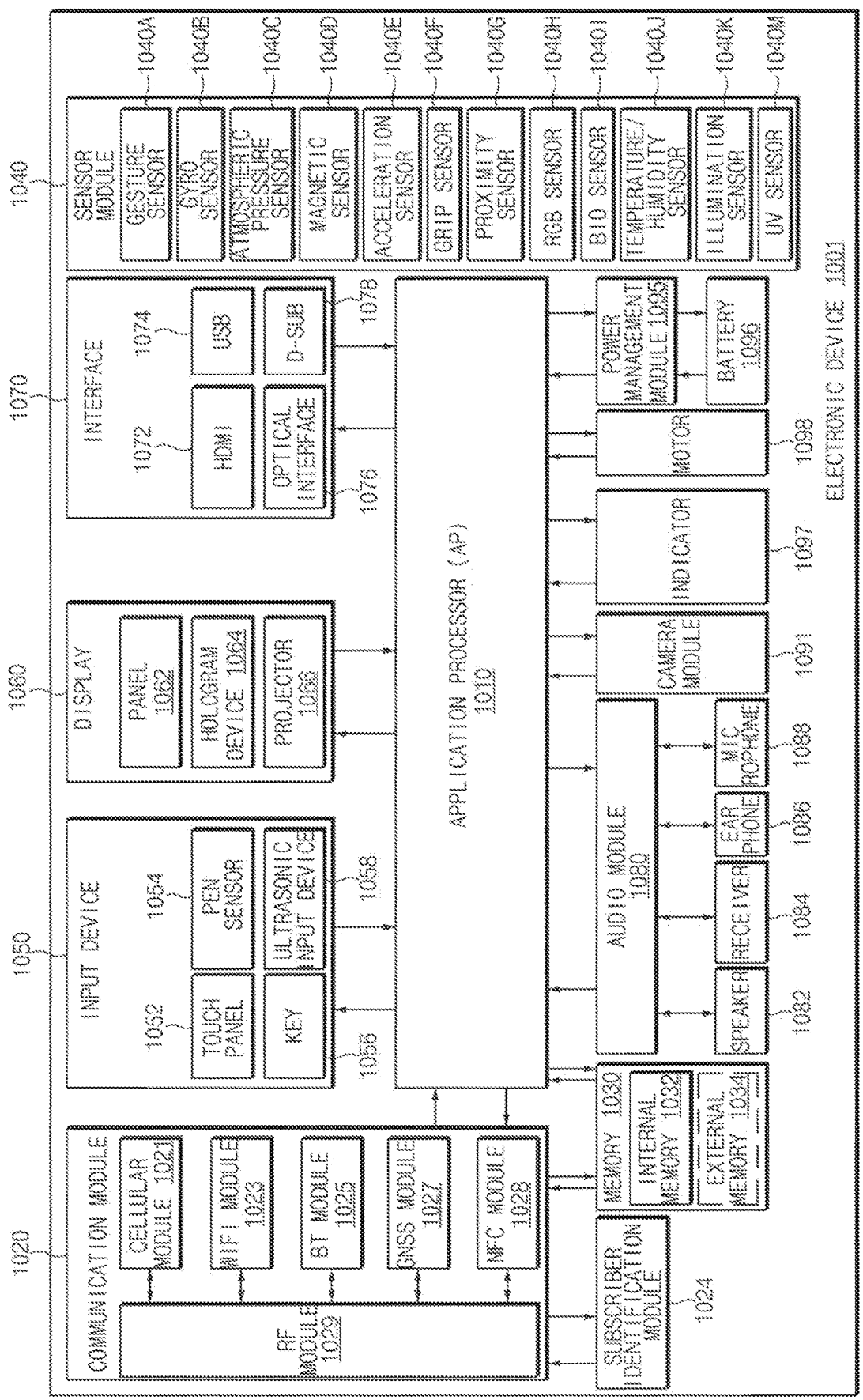
FIG. 10 is a block diagram illustrating a hardware configuration of an electronic device according to an embodiment of the present disclosure.

FIG. 10 is a block diagram illustrating a hardware configuration of an electronic device according to an embodiment of the present disclosure.

Referring to FIG. 10, an electronic device 1001 may include, for example, a part or the entirety of the electronic device 100 illustrated in FIG. 1. The electronic device 1001 may include at least one processor (e.g., AP) 1010, a communication module 1020, a SIM 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an operating system or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphics processing unit (GPU) and/or an image signal processor (ISP). The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication module 130 of FIG. 1. The communication module 1020 may include, for example, a cellular module 1021, a Wi-Fi module 1023, a Bluetooth module 1025, a GNSS module 1027 (e.g., a GPS module, a GLONASS module, a BeiDou module, or a Galileo module), an NFC module 1028, and a radio frequency (RF) module 1029.

The cellular module 1021 may provide, for example, a voice call service, a video call service, a text message service, or an internet service through a communication network. According to an embodiment of the present disclosure, the cellular module 1021 may identify and authenticate the electronic device 1001 in the communication network using the SIM 1024 (e.g., a SIM card). According to an embodiment of the present disclosure, the cellular module 1021 may perform at least a part of functions provided by the processor 1010. According to an embodiment of the present disclosure, the cellular module 1021 may include a CP.

Each of the Wi-Fi module 1023, the Bluetooth module 1025, the GNSS module 1027 and the NFC module 1028 may include, for example, a processor for processing data transmitted/received through the modules. According to some various embodiments of the present disclosure, at least a part (e.g., two or more) of the cellular module 1021, the Wi-Fi module 1023, the Bluetooth module 1025, the GNSS module 1027, and the NFC module 1028 may be included in a single integrated chip (IC) or IC package.

The RF module 1029 may transmit/receive, for example, communication signals (e.g., RF signals). The RF module 1029 may include, for example, a transceiver, a power amp module (PAM), a frequency filter, a low noise amplifier (LNA), an antenna, or the like. According to an embodiment of the present disclosure, at least one of the cellular module 1021, the Wi-Fi module 1023, the Bluetooth module 1025, the GNSS module 1027, or the NFC module 1028 may transmit/receive RF signals through a separate RF module.

The SIM 1024 may include, for example, an embedded SIM and/or a card containing a subscriber identity module, and may include unique identification information (e.g., an IC card identifier (ICCID)) or subscriber information (e.g., international mobile subscriber identity (IMSI)).

The memory 1030 (e.g., the memory 120) may include, for example, an internal memory 1032 or an external memory 1034. The internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a micro-SD, a mini-SD, an extreme digital (xD), a multimedia card (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 104011, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040H, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include, for example, a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user.

The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone (e.g., a microphone 1088) so as to identify data corresponding to the ultrasonic waves sensed.

The display 1060 (e.g., the display 160) may include a panel 1062, a hologram device 1064, or a projector 1066. The panel 1062 may have a configuration that is the same as or similar to that of the display 160 of FIG. 1. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. The interface 1070 may be included in the communication module 130 illustrated in FIG. 1. Additionally or alternatively, the interface 1070 may include, for example, a mobile high-definition link (MIL) interface, an SD card/MMC interface, or an infrared data association (IrDA) interface.

The audio module 1080 may convert, for example, a sound into an electrical signal or vice versa. At least a portion of elements of the audio module 1080 may be included in the input/output interface 150 illustrated in FIG. 1. The audio module 1080 may process sound information input or output through a speaker 1082, a receiver 1084, an earphone 1086, or the microphone 1088.

The camera module 1091 is, for example, a device for shooting a still image or a video. According to an embodiment of the present disclosure, the camera module 1091 may include at least one image sensor (e.g., a front sensor or a rear sensor), a lens, an ISP, or a flash (e.g., an LED or a xenon lamp).

The power management module 1095 may manage power of the electronic device 1001. According to an embodiment of the present disclosure, the power management module 1095 may include a power management IC (PMIC), a charger IC, or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile television (TV) may be included in the electronic device 1001. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 110), the processor may perform functions corresponding to the instructions. The computer-readable storage medium may be, for example, the memory 120.

A computer-readable recording medium may include a hard disk, a floppy disk, a magnetic medium (e.g., a magnetic tape), an optical medium (e.g., compact disc ROM (CD-ROM), digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, in a situation in which a network accessible by an electronic device should be searched for, such as a roaming situation, a time taken for the search may be reduced. Furthermore, when the electronic device is turned on, a network search may be performed using a time prior to activation of a SIM.

While the present disclosure has been shown and described with reference to various embodiments thereof, it will be understood by those skilled in the art that various changes in form and details may be made therein without departing from the spirit and scope of the present disclosure as defined by appended claims and their equivalents.

What is claimed is:

1. An electronic device comprising:
   a wireless communication circuit;
   a memory; and
   a processor connected with the wireless communication circuit and the memory, the processor being configured to:
      perform a first network scan to search at least one of a plurality of accessed frequency bands stored in the memory as accessed network information,
      perform a second network scan to sequentially search a plurality of predetermined frequency bands for country information from a mobile country code (MCC), in response to the first network scan failing,
      perform a third network scan to search a plurality of frequency bands related to the country information, in response to the country information being identified based on a result of the second network scan, and
      perform a fourth network to scan all frequency bands supported by the wireless communication circuit, in response to the country information not being identified by the second network scan,
   wherein the plurality of predetermined frequency bands are arranged according to a size of global coverage for each of the plurality of predetermined frequency bands.

2. The electronic device of claim 1, wherein the processor is further configured to perform the first network scan when the electronic device is not connected to a cellular network.

3. The electronic device of claim 2, wherein the accessed network information comprises information of a lastly connected cellular network of the electronic device or a predefined network.

4. The electronic device of claim 1, wherein each of the plurality of predetermined frequency bands is associated with each of a plurality of radio access technologies (RATs).

5. The electronic device of claim 1, wherein the processor is further configured to:
   identify the country information from the mobile country code (MCC) searched from the second network scan.

6. The electronic device of claim 1, wherein the processor is further configured to perform the third network scan to search available frequency bands in a country identified by the country information.

7. A method of an electronic device comprising:
   performing a first network scan to search at least one of a plurality of accessed frequency bands stored in a memory of the electronic device as accessed network information;
   performing a second network scan to sequentially search a plurality of predetermined frequency bands for country information from a mobile country code (MCC), in response to the first network scan failing;
   performing a third network scan to search a plurality of frequency bands related to the country information, in response to the country information being identified based on a result of the second network scan; and
   performing a fourth network to scan all frequency bands supported by a wireless communication circuit of the electronic device, in response to the country information not being identified by the second network scan,
   wherein the plurality of predetermined frequency bands are arranged according to a size of global coverage for each of the plurality of predetermined frequency bands.

8. The method of claim 7, wherein the performing the first network scan comprises performing the first network scan when the electronic device is not connected to a cellular network.

9. The method of claim 8, wherein the accessed network information comprises information of a lastly connected cellular network of the electronic device or a predefined network.

10. The method of claim 7, wherein each of the plurality of predetermined frequency bands is associated with each of a plurality of radio access technologies (RATs).

11. The method of claim 7, the method further comprising:
    identifying the country information from the mobile country code (MCC) searched from the second network scan, if the country information is searched from the second network scan.

12. The method of claim 7, wherein the performing of the third network scan comprises performing the third network scan to search available frequency bands in a country identified by the country information.

* * * * *